UNITED STATES PATENT OFFICE.

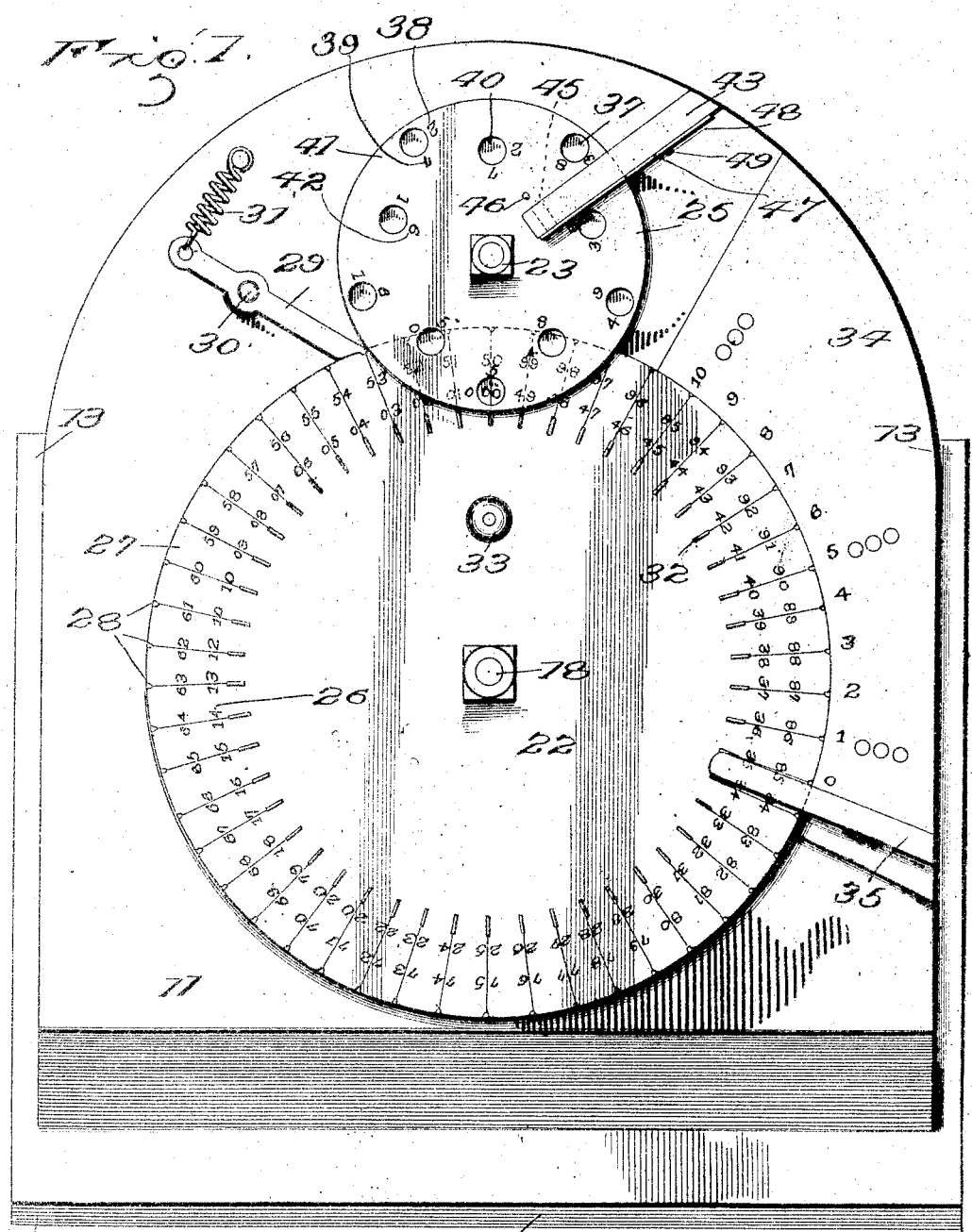

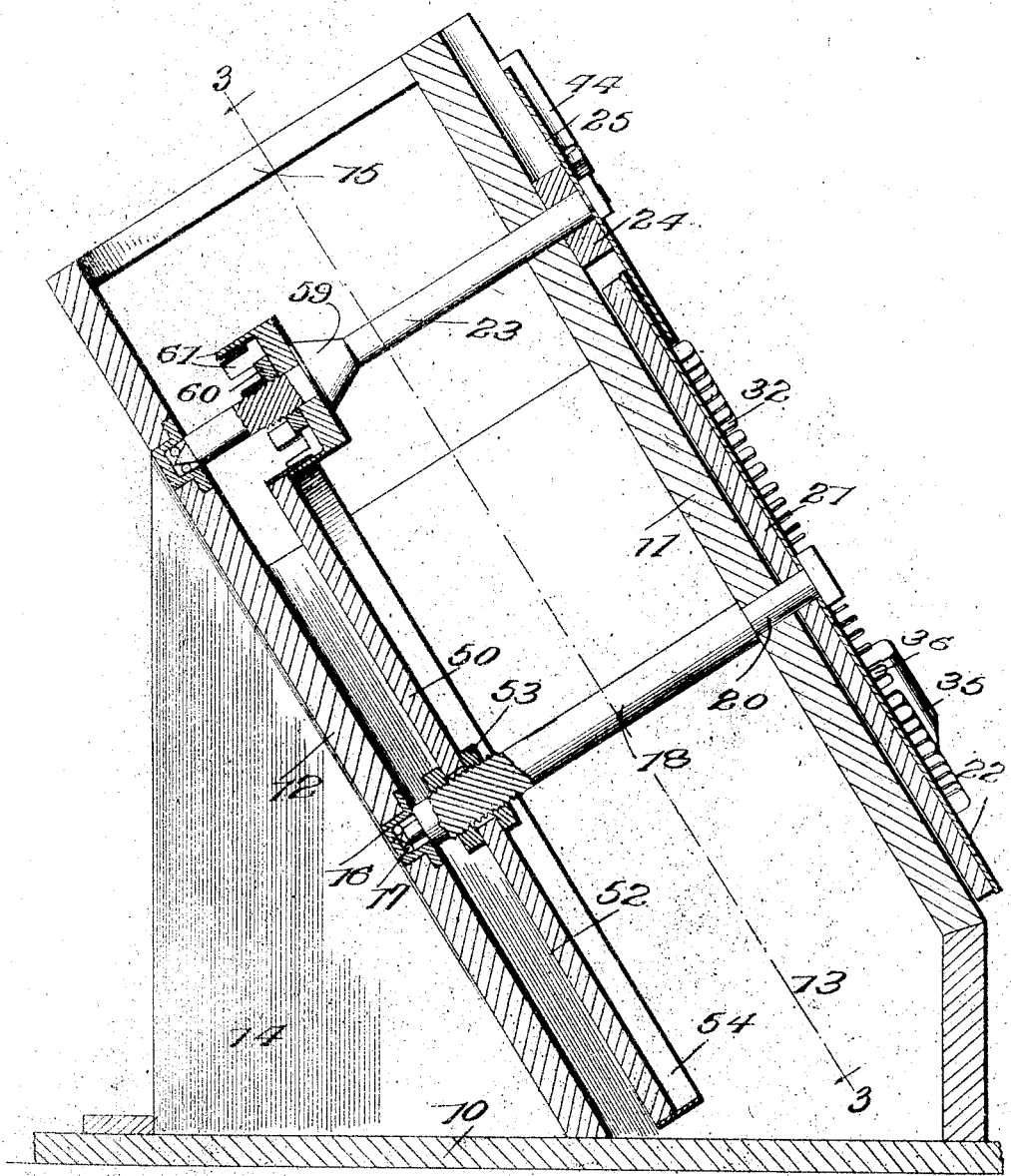

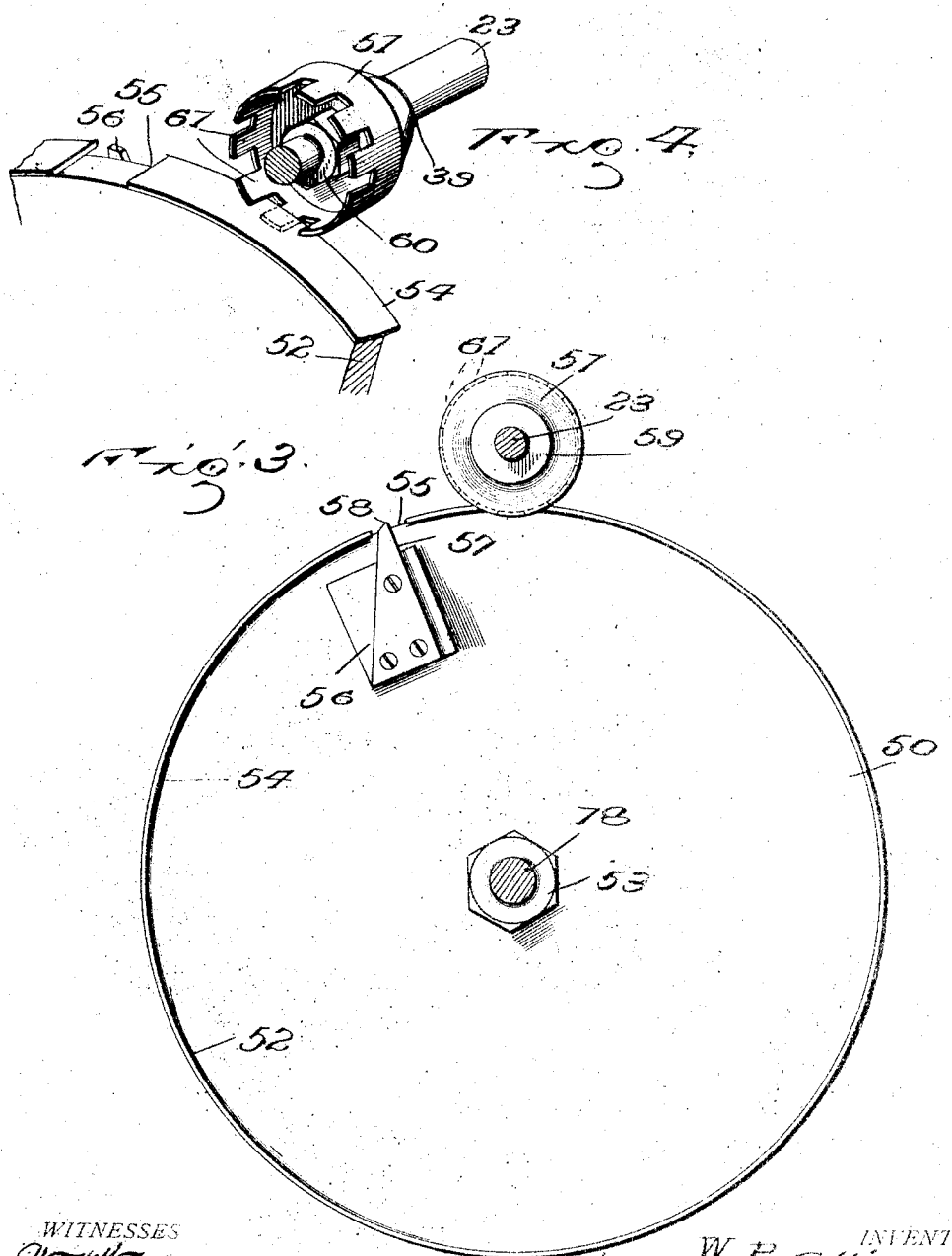

WILLIAM P. SKINNER, OF GARDEN CITY, MINNESOTA.

ADDING-MACHINE.

1,080,023. Specification of Letters Patent. Patented Dec. 2, 1913.

Application filed October 25, 1912. Serial No. 727,794.

*To all whom it may concern:*

Be it known that I, WILLIAM P. SKINNER, citizen of the United States, residing at Garden City, in the county of Blue Earth and State of Minnesota, have invented certain new and useful Improvements in Adding-Machines, of which the following is a specification.

My invention relates to new and useful improvements in adding machines, and the object of my invention is to provide a machine by means of which a column of numbers of any desired length may be readily and quickly added.

A further object of my invention is to provide a machine in which the adding is carried out in the ordinary manner, the units column being first added, then the tens, then the hundreds and so on.

A further object of my invention is to provide an adding machine including a number carrying indicator plate, a revolving disk also carrying numbers, and a second revolving number disk, the first disk co-acting with the plate in the adding of numbers, while the second disk indicates the hundreds.

A further object of my invention is to provide a simple and effective form of gearing between the disks whereby the disk indicating the hundreds is intermittently driven by the first disk. And a still further object of my invention is to provide a lock so arranged that the hundreds disk can be revolved but once without first releasing the lock, the locking of the hundreds disk after one complete revolution also resulting in the locking of the other disk.

With these and other objects in view, my invention will be more fully described, illustrated in the accompanying drawings, and then specifically pointed out in the claims which are attached to and form a part of this application.

In the drawings: Figure 1 is a front elevation of my improved adding machine; Fig. 2 is a central vertical section of the same; Fig. 3 is a section on the line 3—3 of Fig. 2; Fig. 4 is a fragmentary perspective view, showing the form of gear employed in transmitting movement from one disk to the other.

Corresponding and like parts are referred to in the following description and indicated in all the views of the drawings by the same reference characters.

The preferred form of my invention includes a supporting casing, preferably formed of wood, having a base 10, upwardly and rearwardly extending front and back walls 11 and 12 and side walls 13 connecting the front and back walls together and to the base. The casing is further reinforced by a triangular brace 14 seating upon the base of the casing and bearing against the rear wall thereof, while the front and rear walls are additionally secured by a brace 15 connecting said walls at their upper end.

The rear wall of the casing is provided with a recess in which is seated a bearing cup 16 carrying a plurality of ball bearings 17 and one end of a shaft 18 is reduced and beveled as shown at 19 to seat in the bearing thus formed. The opposite end of this shaft 18 is reduced as shown at 20 and journaled in the front wall of the casing with its free end extending in advance of the same. A disk 21 is keyed or otherwise secured upon the extended end of the shaft and carries a dial plate 22 preferably formed of sheet metal, the peripheral edge of which extends slightly beyond the edge of the disk for a reason which will be hereinafter apparent. A second shaft 23 is similarly journaled in bearings formed in the front and rear walls of the casing and keyed upon its forwardly extending end, is a second disk 24 carrying a second dial plate 25. This dial plate 25 is considerably greater in diameter than its disk in order that it may overlap the peripheral edge portion of the dial plate 22, as shown in Fig. 1. The edge portion of the dial disk 22 is stamped or marked with a plurality of numbers, the numbers being arranged in two concentric series and the numbers in each of the series being spaced equally from each other. The numbers in the inner series, indicated at 26, run from zero to 49, while the numbers in the outer series, indicated at 27, run in like manner from 50 to 99. The peripheral edge of the dial disk which extends beyond the disk 21 is notched in radial alinement with these numbers, as shown at 28 and a pawl 29 pivoted upon the front face of the casing as shown at 30 engages in the notches thus formed in the peripheral edge of the disk to lock the same against counterclockwise rotation, this pawl being maintained in place by a spring 31.

Immediately within the inner circle of numbers inscribed upon the disk 22 and in radial alinement with said numbers, are a plurality of outstanding finger pins 32 by means of which the disk may be rotated in a clockwise direction. The disk is further provided with a knob 33 which also serves as a means for rotating the same.

Mounted upon one side of the front wall of the casing and extending by its inner edge beneath the dial disk 22, is an indicator plate 34 carrying a series of unit numbers arranged concentrically with respect to the center of the dial disk 22 and adjacent its periphery, these numbers running consecutively from zero to 10. It will here be noted that the numbers, both upon the disk 22 and the plate 34, are arranged in a counter-clockwise direction upon the disk and indicator plate.

Secured upon the front wall of the casing with its upper edge coinciding with the zero marking of the indicator plate and extending radially with respect to the dial disk 22, is an arm 35, the free end of which extends over the peripheral edge portion of the disk 22, being cut-away as at 36 to permit the passage of the finger pins 32. Because of this peculiar arrangement of numbers upon the dial disk 22 and upon the indicator plate 34, it will be apparent that when the disk 22 is turned to bring any particular number thereon into radial alinement with the zero of the indicator plate, all numbers in the same series lying in radial alinement with the numbers upon the indicator plate will be the sums of the number opposite the zero of the indicator plate and the alined number on the indicator plate. For instance, the number 85 is shown in radial alinement with the zero marking of the indicator plate in Fig. 1 and the number 92 is shown in radial alinement with the number 7 of the indicator plate, 92 therefore being the sum of the numbers 85 and 7. In like manner, the number 40 lying in alinement with the number 5 of the indicator plate is the sum of 5 and 35 the number lying in alinement with the number zero of the indicator plate and in the same series with the number 40.

It will be apparent that the dial disk 22 may be turned either by means of the finger pins 32 or the knob 33 to bring any of its numbers in successive alinement with the zero of the indicator scale. The finger pins 32 are preferably employed for this purpose as rotation of the disk will be stopped when they are employed upon their passage beneath the arm 35 against which the operating finger will strike.

In adding a column of figures, the unit fingers are first added, then the tens, then the hundreds and so on. The first number in the units column is located upon the dial disk 22 and said disk is turned in a clockwise direction to bring this number in alinement with the zero marking of the indicator plate. The next number in the units column is found upon the indicator plate and the number lying opposite that in the same series of numbers on the dial disk as the first is the sum of the first two numbers as previously explained. The dial disk is then rotated to bring the sum thus found into alinement with the zero marking of the indicator plate and the third unit number located upon the indicator plate and the sum of the first three numbers found upon the dial disk, this being repeated until all the unit numbers have been added together. If the final sum of the unit numbers is such that a certain number must be carried when the tens are to be added, this number to be carried is used as the first number of the tens column and the tens successively added in the manner above described. It will of course be apparent that the hundreds and thousands are added in the same way. In order to temporarily indicate the number of revolutions which the dial disk 22 has made during this adding operation, I have provided the second dial disk previously designated by the numeral 25 and I have further provided a gearing, the construction of which will be hereinafter explained, which causes the second dial disk 25 to be rotated through 36 degrees for each complete rotation of the dial disk 22 or through 72 degrees for every two rotations of the dial disk 22. This dial disk 25 is provided adjacent its peripheral edge with a plurality of spaced apart openings 37 which, as the disk 25 is rotated, successively pass over the zero marking of the dial disk 22 exposing the same to view. Stamped or otherwise inscribed at the side of each of these openings, is a number indicated at 38 which indicates the number of double rotations of the dial disk 22. As the dial disk 22 revolves twice for each hundred added to the sum, it will be apparent that this number indicates the hundreds, while the number upon the dial disk 22 adjacent the last number added indicates the tens and units. Marked upon the dial disk 25 adjacent each of these openings 37, but between them and the center of the disk, is a second series of numbers 39 which indicate the hundreds during the second revolution of the dial disk 25. These openings, as shown, occur at regular spaced intervals of 72 degrees and a second series of openings 40 are formed in the dial disk 25 also occurring at spaced intervals of 72 degrees. These latter openings are concentrically formed with respect to the dial disk and in position to pass over and expose the numbers upon the outer series of the dial disk 22. Each of these openings 40 lies midway between adjacent openings 37 and may therefore be employed in connection with the openings 37 for indicating the sum added. For this reason, a number designated by the numeral 41 is marked upon the dial disk immediately to one side of each of these openings 40, this number being the same as that at the side of the opening 37 which immediately precedes it in the counterclockwise rotation of the dial disk 25.

In adding numbers, the sum of which is at all times below 500, the number of hundreds may be read either from the opening 37 in alinement between the centers of the dial disks 22 and 25, or from the opening 41 in alinement with said centers, the outer openings 37 indicating the hundreds, while the number is between a certain hundred and the same 150, while the inner opening is employed for reading the number when the number is between a certain 150 and the next hundred. A second series of numbers 42 is also inscribed upon the dial disk 25, these numbers being arranged in the same manner with respect to the openings 41 as are the numbers 39 of the openings 37. These numbers are employed in reading the hundreds between 500 and 1000, as also are the numbers of the series 39.

In order that the operator may know when the dial disk 25 has finished one complete revolution and that he may consequently know whether to read the number from one of the series 38 and 41 or from one of the series 39 and 42, I have provided a catch indicated as a whole by the numeral 43. This catch includes an arm 44 extending over the dial disk 25 and provided in its inner face with a slot 45 through which a pin 46 carried by the dial disk 25 may pass during the turning of said disk. A catch plate 47 is pivotally mounted by one end upon the arm 44, as shown at 48 and in lowered position closes one end of the slot 45 to prevent the passage of the pin therethrough. This plate is arranged to swing in a plane at right angles to the front wall of the casing and is held against swinging movement in any other plane by slotted engagement with a pin 49 carried by the arm 44.

When the dial disk 25 is turned through one complete revolution, this pin 46 engages against the plate 47 to prevent further rotation of the disk until the plate has been manually raised, this catch therefore giving the necessary warning to the operator. If numbers over a thousand are to be added, the number of thousands must be set down on paper or carried in the head of the operator although if deemed advisable a third dial disk can be provided to co-act with the dial disk 25 to register the thousands. This however, is hardly deemed necessary.

Having thus described the theory of my improved adding machine I will now explain the manner in which the rotation of the dial disk 22 is transmitted to the shaft 23 to intermittently drive the dial disk 25. This means includes a flange wheel 50 secured upon the shaft 18 and adapted to rotate therewith and a crown gear 51 similarly secured upon the shaft 23 and co-acting with the flange wheel. The flange wheel 50 comprises a disk shaped body member 52 which is secured upon the shaft 18 between jam nuts 53 which are threaded upon the shaft to bear one upon either side of the body member and a peripherally formed laterally extending flange 54. This flange is provided at a point corresponding to the zero 50 marking of the disk 22 with an opening 55 and mounted upon a boss 56 formed in the inner face of the body member 52, is a finger 57 having a beveled terminal 58 extending into this opening.

The crown gear 51 is firmly secured against a shoulder 59 formed integrally with the shaft 23 by a jam nut 60 and is provided with a plurality of laterally directed spaced teeth 61. As best shown in Fig. 4 of the drawings one of these teeth engages against the inner face of the flange 54 of the flange wheel, while the adjacent teeth bear against the outer face of said flange It will therefore be apparent that the rotation of the flange wheel will be transmitted to the crown gear only when that tooth 60 of the crown gear engaging beneath the flange of the flange wheel is engaged by the beveled terminal 58 of the finger 57. When so engaged the crown gear is turned to a distance equal to the space between its teeth and the next adjacent tooth is brought into position beneath the flange of the wheel 50. It will therefore be apparent that movement is transmitted to the shaft 23 but once during each rotation of the shaft 18 and that this movement is equal only to the distance between adjacent teeth of the crown gear. The crown gear is formed with ten teeth in order that the dial disk 25 may be rotated but 36 degrees for each complete rotation of the dial disk 22 as previously described.

From the foregoing description, taken in connection with the drawings, the operation of my improved device will be readily apparent and no further explanation of the same is required. It might be noted however, that the chief function of the knob 33 is to permit the ready, rapid and continued turning of the dial disk 22 and consequently of the dial disk 25 to bring the parts to original position after the numbers have been added. When so setting the machine, the disks may be turned in either direction as convenient depending upon how large the sum previously added is as the pawl 29 may be readily swung out of engagement with the disk 22 to permit its reverse rotation, if desired.

It will of course be understood that various changes in the details of construction, may be made if desired, without in the slightest degree departing from the spirit of my invention.

Having thus described the invention, what is claimed as new is:

1. An adding machine including a fixed indicator plate, spaced shafts, rotatable dial disks mounted one upon each of said shafts and overlapping each other, and means coacting between the shafts, whereby a complete revolution of one shaft will partially revolve the other shaft the numbers of one disk being readable through openings formed in the other disk.

2. An adding machine including a revoluble dial plate provided with concentrically arranged series of scale divisions, the divisions of each scale being consecutively numbered and the numbers of one scale forming a continuation of those of the other, a fixed indicator plate provided with a scale, the numbers of which are in alinement with the divisions of the dial, a second revoluble dial plate overlapping the first and provided with series of concentrically arranged spaced openings having numbers, the openings of one series exposing a portion of one scale of the first dial while the openings of the other series expose the other scale of the first dial, and means operable by the rotation of the first dial for intermittently rotating the second dial.

3. An adding machine including a fixed indicator plate, spaced shafts, rotatable dial disks mounted one on each of said shafts, means coacting with the shafts whereby a complete revolution of one shaft will partially revolve the other shaft, an arm extending over the face of one of said disks and provided in its under face with a channel, a pin carried by said disk and adapted for passage through the channel, and a plate pivoted to the arm and normally extending across the channel to prevent passage of the pin.

4. An adding machine including a fixed indicator plate, spaced shafts, rotatable dial disks mounted one on each of said shafts, means coacting with the shafts whereby a complete revolution of one shaft will partially revolve the other shaft, an arm extending over the face of one of said disks and provided in its under face with a channel, a pin carried by said disk and adapted for passage through the channel, a plate pivoted to the arm and normally extending across the channel to prevent passage of the pin, and means for holding said plate against all swinging movement other than at right angles to the disk.

In testimony whereof I affix my signature in presence of two witnesses.

WILLIAM P. SKINNER. [L. S.]

Witnesses:
R. G. SMITH,
F. R. BARTLETT.